United States Patent
Ding et al.

(10) Patent No.: US 8,625,419 B2
(45) Date of Patent: Jan. 7, 2014

(54) METHOD AND DEVICE FOR ADJUSTING TRANSMISSION OF TRANSPORT NETWORK DATA

(75) Inventors: Chiwu Ding, Shenzhen (CN); Huaping Qing, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 420 days.

(21) Appl. No.: 13/070,303

(22) Filed: Mar. 23, 2011

(65) Prior Publication Data

US 2011/0170861 A1    Jul. 14, 2011

Related U.S. Application Data

(63) Continuation of application No. PCT/CN2009/074084, filed on Sep. 22, 2009.

(30) Foreign Application Priority Data

Sep. 24, 2008    (CN) .......................... 2008 1 0161548

(51) Int. Cl.
*H04L 12/26* (2006.01)
*H04L 12/28* (2006.01)
*H04B 17/00* (2006.01)

(52) U.S. Cl.
USPC .............. 370/230; 370/232; 370/252; 398/25

(58) Field of Classification Search
None
See application file for complete search history.

(56) References Cited

U.S. PATENT DOCUMENTS

| | | |
|---|---|---|
| 2002/0181479 A1 | 12/2002 | Okuno |
| 2006/0018324 A1 | 1/2006 | Nisar et al. |
| 2006/0062161 A1 | 3/2006 | Tang et al. |
| 2006/0209861 A1 | 9/2006 | Iwabuchi et al. |
| 2007/0242676 A1 | 10/2007 | Fridman |
| 2008/0144661 A1* | 6/2008 | Ali ................................. 370/468 |
| 2008/0317465 A1* | 12/2008 | Yu .................................. 398/52 |

FOREIGN PATENT DOCUMENTS

| | | |
|---|---|---|
| CN | 101005327 A | 7/2007 |
| CN | 101243656 A | 8/2008 |
| EP | 1 675 292 A1 | 6/2006 |
| WO | WO 2007/045448 A1 | 4/2007 |

OTHER PUBLICATIONS

Supplementary European Search Report dated Jan. 20, 2012 in connection with European Patent Application No. EP 09 81 7238.
"Link capacity adjustment scheme (LCAS) for virtual concatenated signals", ITU-T Recommendation G.7042/Y.1305, Mar. 2006, 37 pages.

(Continued)

*Primary Examiner* — Marcus R Smith

(57) ABSTRACT

In the field of optical communications, a method and a device for adjusting transmission of transport network data are provided. The method includes the following steps. Information of adjusting a designated Optical Transport Network (OTN) line sent from an OTN is received. The OTN line corresponding to the information of adjusting the designated OTN line is adjusted. Changed data traffic of the adjusted OTN line is calculated. An Ethernet channel to be adjusted according to the changed data traffic is designated, and the Ethernet channel to be adjusted is adjusted correspondingly. The device includes a Link Capacity Adjustment Scheme (LCAS) module and a channel processing module. According to the method and the device, the adjustment of the OTN line is associated with the adjustment of the Ethernet channel, thereby ensuring the data transmission efficiency, and improving the overall performance of a network.

4 Claims, 5 Drawing Sheets

(56) References Cited

OTHER PUBLICATIONS

Written Opinion of the International Searching Authority dated Dec. 31, 2009 in connection with PCT Application No. PCT/CN2009/074084.

"Draft Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications", IEEE P802.3ba/D2.0, Mar. 12, 2009, 402 pages.

International Search Report dated Dec. 31, 2009 in connection with PCT Application No. PCT/CN2009/074084.

* cited by examiner

METHOD AND DEVICE FOR ADJUSTING TRANSMISSION OF TRANSPORT NETWORK DATA

CROSS-REFERENCE TO RELATED APPLICATIONS

This application is a continuation of International Application No. PCT/CN2009/074084, filed on Sep. 22, 2009, which claims priority to Chinese Patent Application No. 200810161548.9, filed on Sep. 24, 2008, both of which are hereby incorporated by reference in their entireties.

TECHNICAL FIELD

The present invention relates to the field of optical communications, and more particularly to a method and a device for adjusting transmission of transport network data.

BACKGROUND

Optical Transport Network (OTN), as a core technology of the next generation transport network, has abundant Operation, Administration, and Maintenance (OAM) capabilities, enables the flexible scheduling and management of high-capacity services, and thus becomes a mainstream technology of the backbone transport network.

In signal transmission, an Ethernet needs to use an OTN to bear Ethernet signals, so as to achieve the high-capacity and long-distance transport of information. Considering the technology maturity and cost, the bearer capability of an OTN line is limited. When the bandwidth of a single OTN line is inadequate to bear Ethernet data traffic, virtual concatenation may be used to combine multiple OTN lines, so as to provide a higher bandwidth, and complete the data transport. For example, in an OTN with a bandwidth of 10 Gbps, a container of Optical Channel Payload Unit-2 (OPU2) grade may contain at most 10 Gbps of data information. If 40 Gbps of data needs to be transported, 4 containers of OPU2 grade are combined by using the virtual concatenation technology to form a 4 virtually concatenated OPU2s (OPU2-4V) container to bear the 40 Gbps bandwidth. The Ethernet data is encapsulated into 4 OPU2 containers which are individually added with corresponding virtual concatenation indication information, and then is carried in 4 independent Optical Channel Transport Unit-2 (OTU2) frames, so as to transport the data through 4 independent OTN lines. At a receiving end, the received 4 independent frames are de-framed to provide 4 OPU2 containers, and the 4 OPU2 containers are assembled to form an OPU2-4V container by identifying the virtual concatenation indication information, which is decapsulated to provide correct data.

Generally, the scheme that the OTN uses the virtual concatenation technology to bear Ethernet signals has the following requirements.

1. When partial line failure occurs to the OTN, the Ethernet needs to adjust the traffic correspondingly. For example, if a certain OTN line fails, the corresponding channel cannot correctly transmit data. In this case, an Ethernet equipment must decrease the data traffic to ensure the normal transmission of data. As the Ethernet data is transmitted though multiple channels in parallel, and the data among the channels is correlated to each other, after a part of the channels fail, other channels cannot combine and obtain the correct data, resulting in failure of the Ethernet data transmission. Accordingly, the Ethernet is required to decrease the traffic, so as to enable the signal to be transmitted on available channels.

2. When the data traffic of the Ethernet equipment is adjusted, the OTN needs to perform line adjustment correspondingly, so as to save OTN line resources.

FIG. 1 shows a solution of the prior art, and is a schematic view of the framework supporting OTN line capacity adjustment according to the prior art. As shown in FIG. 1, Ethernet data is processed by a receiving unit, and transferred to an encapsulation unit, which encapsulates Ethernet signals into a virtually concatenated container based on the rate grade, for example, encapsulates the signals into a virtually concatenated container according to the rate grade of OPU2. Then, the encapsulated data is framed to generate OTU format signals capable of being transmitted in an OTN line, optical signal conversion is performed on the OTU signals by an OTN line sending unit, and the signals are then transmitted in an optical fiber. In the prior art, through the interaction between a Link Capacity Adjust Scheme (LCAS) module and an encapsulation unit, a decapsulation unit, a virtual concatenation framing/de-framing unit, and an Ethernet line transceiver unit, the dynamic line adjustment and the partial line failure protection of the OTN may be achieved.

After the research on the prior art, the inventors find that in the prior art, the dynamic line adjustment and the partial line failure protection functions only become effective in the OTN, and cannot interact with an Ethernet equipment. When a part of the OTN line fails such that a corresponding channel becomes unavailable, the Ethernet equipment cannot be informed of the change in time to decrease data traffic, so that the multi-channel data cannot be combined to obtain correct data, resulting in the Ethernet data transmission failure. Moreover, when the Ethernet equipment traffic is adjusted, the OTN cannot carry out corresponding adjustment, for example, when Ethernet data traffic is decreased, the OTN still provides a large bandwidth, thereby causing resource waste.

SUMMARY

In order to achieve efficient utilization of OTN resources and ensure effectiveness of data transmission, the present invention is directed to a method and a device for adjusting transmission of transport network data. The present invention provides the following technical solutions.

A method for adjusting transmission of transport network data is provided, which includes the following steps.

Information of adjusting a designated OTN line sent from an OTN is received.

The OTN line corresponding to the information of adjusting the designated OTN line is adjusted.

Changed data traffic of the adjusted OTN line is calculated.

An Ethernet channel to be adjusted according to the changed data traffic is designated, and the Ethernet channel to be adjusted is adjusted correspondingly.

The present invention is further directed to a device for adjusting transmission of transport network data, which includes an LCAS module and a channel processing module.

The LCAS module is configured to receive information of adjusting a designated OTN line sent from an OTN, adjust the OTN line corresponding to the information of adjusting the designated OTN line, and calculate changed data traffic of the adjusted OTN line and send information of the changed data traffic to the channel processing module.

The channel processing module is configured to receive the information of the changed data traffic sent from the LCAS module, designate an Ethernet channel to be adjusted according to the changed data traffic, and adjust the Ethernet channel to be adjusted correspondingly.

According to the embodiments of the present invention, a channel processing module is added so that the Ethernet equipment can interact with the OTN. Thus, when the OTN performs OTN line adjustment, the Ethernet equipment can also correspondingly adjust the data traffic and channel, thereby ensuring the correct transmission of data, and improving the overall performance of a network.

BRIEF DESCRIPTION OF THE DRAWINGS

To make the technical solution of the present invention clearer, the accompanying drawings for illustrating the embodiments of the present invention or the prior art are outlined below. Apparently, the accompanying drawings are for the exemplary purpose only, and person having ordinary skill in the art can derive other drawings from such accompanying drawings without any creative effort.

DETAILED DESCRIPTION

To make the technical solutions of the present invention more comprehensible, the present invention is described in detail with reference to the accompanying drawings and embodiments as follows. Apparently, the described embodiments are only a part rather than all embodiments of the present invention. Those skilled in the art can derive other embodiments from the embodiments given herein without making any creative effort, and all such embodiments are covered in the protection scope of the present invention.

Embodiment 1

Figure 1:
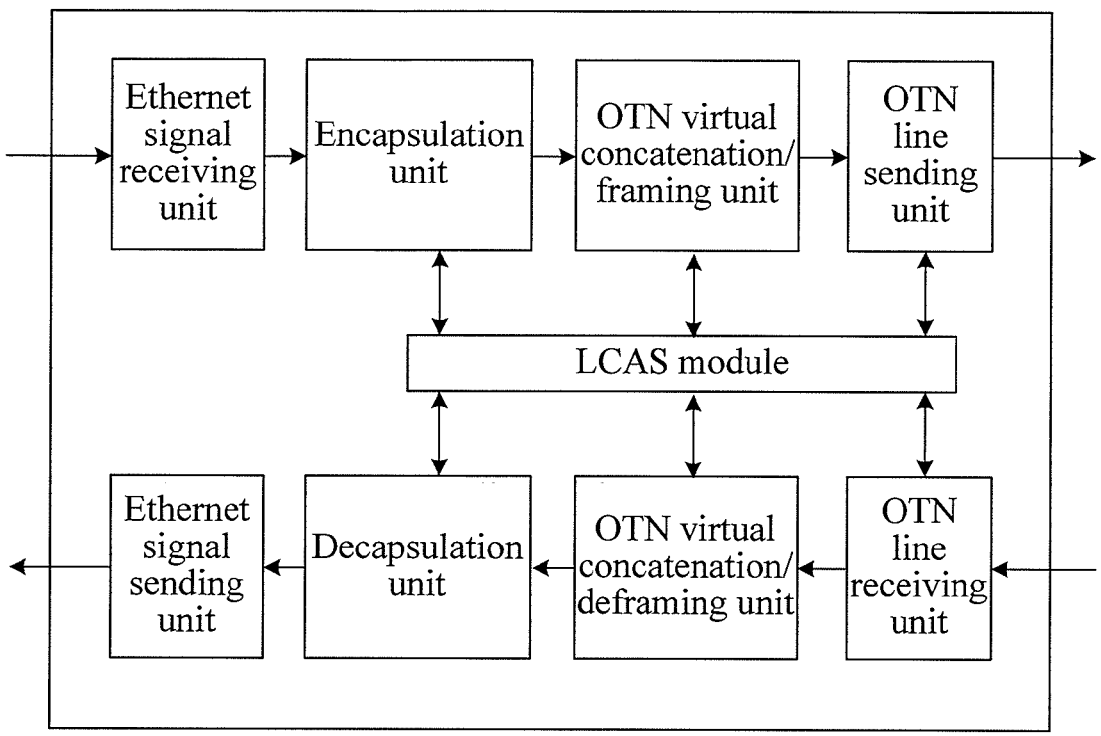
FIG. 1 is a schematic view of a framework supporting OTN line capacity adjustment provided in the prior art.
Figure 2:
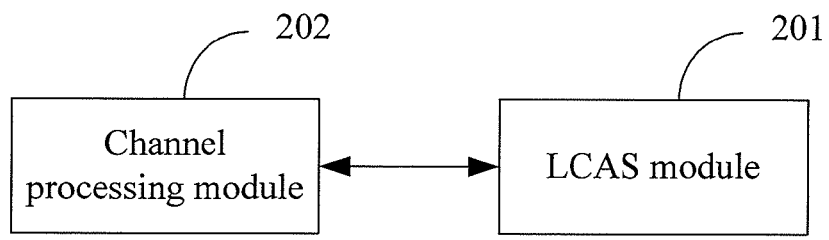
FIG. 2 is a structural view of a device for adjusting transmission of transport network data according to Embodiment 1 of the present invention.

In the embodiment, the present invention provides a device for adjusting transmission of transport network data. FIG. 2 is a structural view of the device for adjusting transmission of transport network data according to Embodiment 1 of the present invention. As shown in FIG. 2, the device includes an LCAS module 201, and a channel processing module 202.

The LCAS module 201 is configured to receive information of adjusting a designated OTN line sent from an OTN, adjust the OTN line corresponding to the information of adjusting the designated OTN line, calculate changed data traffic of the adjusted OTN line, and send information of the changed data traffic to the channel processing module 202.

The channel processing module 202 is configured to receive the information of the changed data traffic sent from the LCAS module 201, designate an Ethernet channel to be adjusted according to the changed data traffic, and adjust the Ethernet channel to be adjusted correspondingly.

According to this embodiment, the channel processing module is added so that the Ethernet equipment can interact with the OTN. Thus, when the OTN performs OTN line adjustment, the Ethernet equipment can also correspondingly adjust the data traffic and the Ethernet channel, thereby ensuring the correct transmission of data, and improving the overall performance of a network.

Embodiment 2

Figure 3:
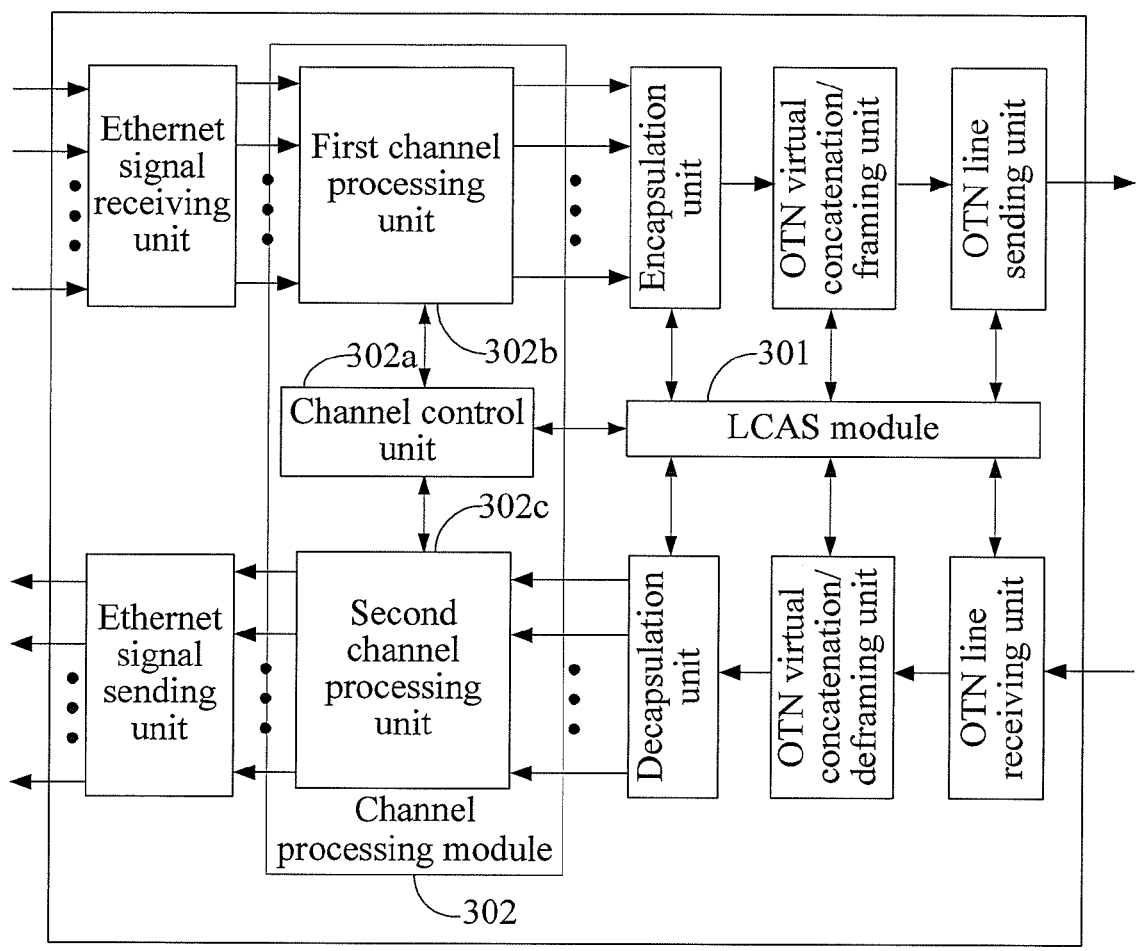
FIG. 3 is a structural view of a device for adjusting transmission of transport network data according to Embodiments 2 and 3 of the present invention.

In the embodiment, the present invention provides a device for adjusting transmission of transport network data. FIG. 3 is a structural view of the device for adjusting transmission of transport network data according to Embodiments 2 and 3 of the present invention. As shown in FIG. 3, the device includes an LCAS module 301, and a channel processing module 302.

The LCAS module 301 is configured to receive information of adjusting a designated OTN line sent from an OTN, adjust the OTN line corresponding to the information of adjusting the designated OTN line, calculate changed data traffic of the adjusted OTN line, and send information of the changed data traffic to the channel processing module 302.

The channel processing module 302 is configured to receive the information of the changed data traffic sent from the LCAS module 301, designate an Ethernet channel to be adjusted according to the changed data traffic, and adjust the Ethernet channel to be adjusted correspondingly.

The LCAS module 301 further includes a capacity decrease unit and a capacity increase unit.

The capacity decrease unit is configured to close the OTN line corresponding to the information of adjusting the designated OTN line when the information of adjusting the designated OTN line sent from the OTN is to close the OTN line, calculate decreased data traffic of the OTN line after closing the OTN line corresponding to the information of adjusting the designated OTN line, and send information of the decreased data traffic to the channel processing module 302.

The capacity increase unit is configured to open the OTN line corresponding to the information of adjusting the designated OTN line when the information of adjusting the designated OTN line sent from the OTN is to open the OTN line, calculate increased data traffic of the OTN line after opening the OTN line corresponding to the information of adjusting the designated OTN line, and send information of the increased data traffic to the channel processing module 302.

Specifically, when needing to close a part of the designated OTN line, the OTN sends information of closing the designated OTN line to the LCAS module 301; and after receiving the information of closing the designated OTN line, the LCAS module 301 acquires the OTN line to be adjusted and closed, and closes the OTN line to be adjusted and closed, that is, deletes a virtually concatenated container in the OTN line through negotiation with the OTN. Correspondingly, when needing to open a part of the designated OTN line, the OTN sends information of opening the designated OTN line to the LCAS module 301; after receiving the information of opening the designated OTN line, the LCAS module 301 acquires the OTN line to be adjusted and opened, and opens the OTN line, that is, adds a virtually concatenated container in the OTN line through negotiation with the OTN.

The channel processing module 302 further includes a channel control unit 302a, a first channel processing unit 302b, and a second channel processing unit 302c. According to the embodiment of the present invention, based on the receiving and the sending of Ethernet signals, the channel processing unit is divided into the first channel processing unit 302b in a receiving direction, and the second channel processing unit 302c in a sending direction, and the two channel processing units are both controlled by the channel control unit 302a.

The channel control unit 302a is configured to designate an Ethernet channel to be closed according to the decreased data traffic when the changed data traffic is the decreased data traffic, and send control information of closing the Ethernet channel to be closed to the first channel processing unit 302b and the second channel processing unit 302c; and designate an Ethernet channel to be opened according to the increased data traffic when the changed data traffic is the increased data traffic, and send control information of opening the Ethernet channel to be opened to the first channel processing unit 302b and the second channel processing unit 302c.

The first channel processing unit 302b is configured to stop receiving data from the Ethernet channel to be closed when receiving the control information of closing the Ethernet channel to be closed, and send data of the Ethernet channel to be opened when receiving the control information of opening the Ethernet channel to be opened.

The second channel processing unit 302c is configured to stop sending data to the Ethernet channel to be closed when receiving the control information of closing the Ethernet channel to be closed, and insert indication information in the Ethernet channel to be closed for instructing the Ethernet equipment not to transmit data on the Ethernet channel to be closed; and send data to the Ethernet channel to be opened when receiving the information of opening the Ethernet channel to be opened, and insert indication information in the Ethernet channel to be opened for instructing the Ethernet equipment to transmit data on the Ethernet channel to be opened.

After the adjustment of the Ethernet channel and the OTN line is completed, the Ethernet equipment transmits data on the adjusted Ethernet channel according to the indication information inserted by the second channel processing unit 302c. The channel control unit 302a sends notification information to the LCAS module 301, in which the information includes the adjusted Ethernet channel, so as to inform the LCAS module 301 of processing data according to the adjusted Ethernet channel. The LCAS module 301 sends control information to an encapsulation unit and a decapsulation unit according to the notification information sent from the channel control unit 302a, in which the control information includes information of the adjusted Ethernet channel and total capacity of the OTN lines, so as to control the encapsulation and the decapsulation units to process data according to the adjusted Ethernet channel and total capacity of the OTN lines.

For example, in normal cases, ten 10 Gbps Ethernet signals are born by ten OTN lines, that is, the encapsulation unit encapsulates the ten input 10 Gbps Ethernet signals into ten virtually concatenated containers, in which data in Channel 1 to Channel 10 is encapsulated. When four virtually concatenated containers fail, the total bearer capacity of the OTN line is decreased to 60 Gbps, such that the Ethernet equipment is also required to correspondingly decrease data traffic. When the data traffic of the Ethernet equipment is correspondingly decreased, and the data is transmitted on Channel 1 to Channel 6, the LCAS module 301 sends information indicating that the capacity of the virtually concatenated containers is 60 Gbps and control information of encapsulating the data in Channel 1 to Channel 6 to the encapsulation unit. After receiving the control information, the encapsulation unit encapsulates the data in Channel 1 to Channel 6 into six virtually concatenated containers. The decapsulation principle of the data is the same as above, and details thereof are not described here again.

According to this embodiment, the channel processing module is added so that the Ethernet equipment can interact with the OTN. Thus, when the OTN performs OTN line adjustment, the Ethernet equipment can also correspondingly adjust the data traffic and the channel, thereby ensuring the correct transmission of data, and improving the overall performance of a network.

Embodiment 3

According to the embodiment of the present invention, the device for adjusting transmission of transport network data is also applicable to a case in which the Ethernet channel is adjusted when the traffic of the Ethernet equipment is changed, and the OTN is requested to perform corresponding adjustment on the OTN line. Referring to FIG. 3, in this case, the functions of the modules of the device are as follows.

The channel processing module 302 is also configured to receive information of adjusting a designated Ethernet channel sent from an Ethernet equipment, adjust the Ethernet channel corresponding to the information of adjusting the designated Ethernet channel, calculate changed data traffic according to the information of adjusting the designated Ethernet channel, and send the changed data traffic to the LCAS module 301.

The LCAS module 301 is also configured to receive the information of the changed data traffic sent from the channel processing module 302, designate an OTN line to be adjusted according to the changed data traffic, and adjust the OTN line to be adjusted correspondingly.

The channel processing module 302 further includes a channel control unit 302a, a first channel processing unit 302b, and a second channel processing unit 302c.

The channel control unit 302a is further configured to send control information of closing the Ethernet channel corresponding to the information of adjusting the designated Ethernet channel to the first channel processing unit 302b and the second channel processing unit 302c when the information of adjusting the designated Ethernet channel is to close the Ethernet channel, calculate decreased data traffic of the Ethernet channel after closing the Ethernet channel corresponding to the information of adjusting the designated Ethernet channel, and send information of the decreased data traffic to the LCAS module 301; and send control information of opening the Ethernet channel corresponding to the information of adjusting the designated Ethernet channel to the first channel processing unit 302b and the second channel processing unit 302c when the information of adjusting the designated Ethernet channel is to open the Ethernet channel, calculate increased data traffic of the Ethernet channel after opening the Ethernet channel corresponding to the information of adjusting the designated Ethernet channel, and send information of the increased data traffic to the LCAS module 301.

The first channel processing unit 302b is also configured to stop receiving data from the Ethernet channel to be closed when receiving the control information of closing the Ethernet channel to be closed, and send data on the Ethernet channel to be opened when receiving the control information of opening the Ethernet channel to be opened.

The second channel processing unit 302c is configured to stop sending data to the Ethernet channel to be closed when receiving the control information of closing the Ethernet channel to be closed, and insert indication information in the Ethernet channel to be closed for instructing the Ethernet equipment not to transmit data on the Ethernet channel to be closed; and send data to the Ethernet channel to be opened when receiving the information of opening the Ethernet channel to be opened, and insert indication information in the Ethernet channel to be opened for instructing the Ethernet equipment to transmit data on the Ethernet channel to be opened.

The LCAS module 301 further includes a capacity decrease unit and a capacity increase unit.

The capacity decrease unit is also configured to designate an OTN line to be closed according to the decreased data traffic when receiving the information of the decreased data traffic sent from the channel control unit 302a, and close the OTN line to be closed, that is, delete a virtually concatenated container in the OTN line.

The capacity increase unit is also configured to designate an OTN line to be opened according to the increased data traffic when receiving the information of the increased data traffic sent from the channel control unit 302a, and open the OTN line to be opened, that is, add a virtually concatenated container in the OTN line.

According to this embodiment, the channel processing module and the channel control unit are added so that the Ethernet equipment can interact with the OTN. Thus, when the Ethernet equipment performs channel adjustment, the OTN line can also correspondingly perform adjustment, thereby achieving the efficient utilization of the OTN bandwidth resource, and improving the overall performance of a network.

Embodiment 4

Figure 4:
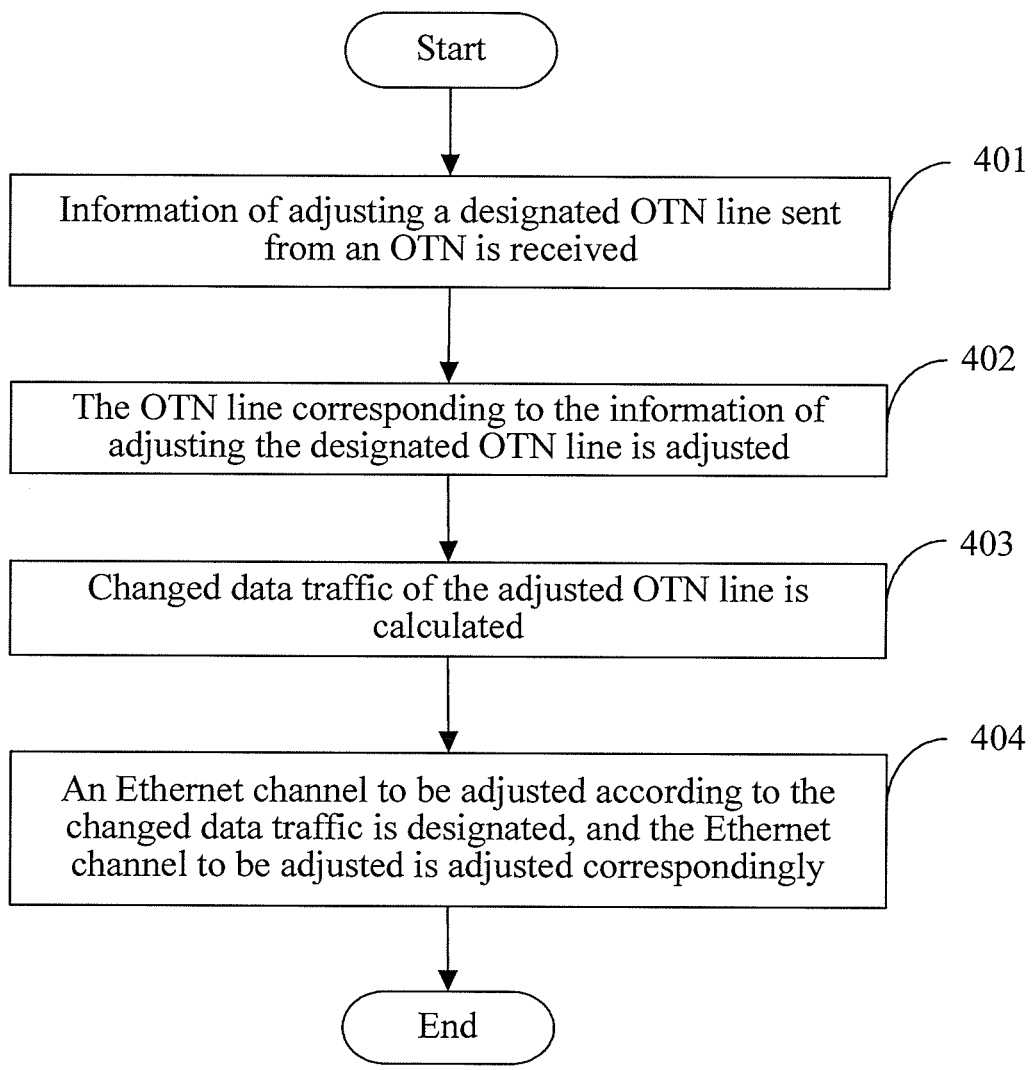
FIG. 4 is a flow chart of a method for adjusting transmission of transport network data according to Embodiment 4 of the present invention.

In the embodiment, the present invention provides a method for adjusting transmission of transport network data. FIG. 4 is a flow chart of the method for adjusting transmission of transport network data according to Embodiment 4 of the present invention. As shown in FIG. 4, the method includes the following steps.

In 401, information of adjusting a designated OTN line sent from an OTN is received.

In 402, the OTN line corresponding to the information of adjusting the designated OTN line is adjusted.

In 403, changed data traffic of the adjusted OTN line is calculated.

In 404, an Ethernet channel to be adjusted according to the changed data traffic is designated, and the Ethernet channel to be adjusted is adjusted correspondingly.

According to this embodiment, a channel processing module is added so that an Ethernet equipment can interact with the OTN. Thus, when the OTN performs OTN line adjustment, the Ethernet equipment can also correspondingly adjust the data traffic and the Ethernet channel, thereby ensuring the correct transmission of data, and improving the overall performance of a network.

Embodiment 5

Figure 5:
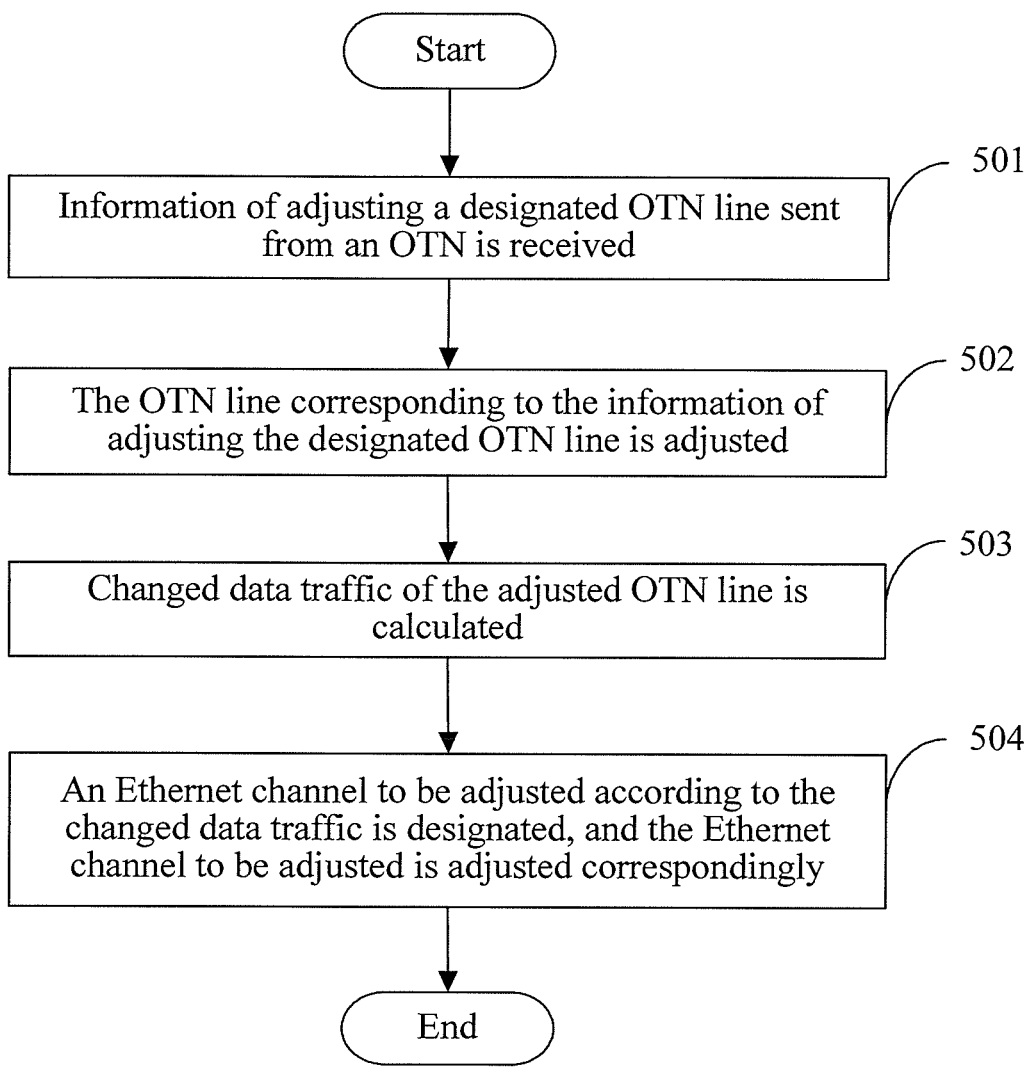
FIG. 5 is a flow chart of a method for adjusting transmission of transport network data according to Embodiment 5 of the present invention.

In the embodiment, the present invention provides a method for adjusting transmission of transport network data, which is applicable to a case in which when an OTN adjusts an OTN line, an Ethernet equipment is requested to correspondingly adjust an Ethernet channel. FIG. 5 is a flow chart of the method for adjusting transmission of transport network data according to Embodiment 5 of the present invention. As shown in FIG. 5, the method includes the following specific steps.

In 501, information of adjusting a designated OTN line sent from an OTN is received.

In 502, the OTN line corresponding to the information of adjusting the designated OTN line is adjusted.

Specifically, the designated OTN line is closed when information of closing the designated OTN line sent from the OTN is received, that is, a virtually concatenated container in the OTN line is deleted. Correspondingly, the designated OTN line is opened when information of opening the designated OTN line sent from the OTN is received, that is, a virtually concatenated container is added in the OTN line.

In 503, changed data traffic of the adjusted OTN line is calculated.

Specifically, data traffic decreased after closing the designated OTN line is calculated according to the information of closing the designated OTN line when the information sent from the OTN is to close the designated OTN line. Correspondingly, data traffic increased after opening the designated OTN line is calculated according to the information of opening the designated OTN line when the information sent from the OTN is to open the designated OTN line.

In 504, an Ethernet channel to be adjusted according to the changed data traffic is designated, and the Ethernet channel to be adjusted is correspondingly adjusted.

Specifically, the Ethernet channel to be closed is designated according to the decreased data traffic when the changed data traffic in the OTN is the decreased data traffic, and the Ethernet channel to be opened is designated according to the increased data traffic when the changed data traffic in the OTN is the increased data traffic.

In addition, when the Ethernet channel to be closed is designated, it should be ensured that the data traffic decreased after closing the Ethernet channel is higher than the data traffic decreased in the OTN. For example, it is assumed that the data traffic decreased in the OTN is 40 Gbps; when the data traffic of a single Ethernet channel is 10 Gbps, four Ethernet channels are closed; when the data traffic of the data in a single Ethernet channel is 25 Gbps, two Ethernet channels must to be closed to ensure the normal transmission of the data. Correspondingly, when the Ethernet channel to be opened is designated, it should also be ensured that the data traffic increased after opening the Ethernet channel is lower than the data traffic increased in the OTN. The designation of the Ethernet channel to be adjusted may be at random, or carried out according to priorities pre-configured for the Ethernet channels.

The Ethernet channel to be adjusted is correspondingly adjusted. Specifically, when the designated Ethernet channel to be adjusted is the Ethernet channel to be closed, sending data on the Ethernet channel to be adjusted is stopped, and indication information is inserted in the Ethernet channel to be adjusted for instructing the Ethernet equipment not to transmit data on the Ethernet channel to be adjusted. Correspondingly, when the designated Ethernet channel to be adjusted is the Ethernet channel to be opened, sending data on the Ethernet channel to be adjusted starts, and indication information is inserted in the Ethernet channel to be adjusted for instructing the Ethernet equipment to transmit data on the Ethernet channel to be adjusted.

As the data traffic of the Ethernet is bidirectional, when the OTN line needs to be closed or opened, it is required that the Ethernet equipment bidirectionally closes or opens the designated Ethernet channel, that is, simultaneously closes or opens the input and output of data on the Ethernet channel.

After the OTN line adjustment and the Ethernet channel adjustment are completed, the Ethernet equipment transmits data on the adjusted Ethernet channel; the OTN processes the transmitted data, for example, encapsulates and decapsulates the transmitted data, according to the adjusted Ethernet channel and total capacity of the OTN lines.

According to this embodiment, the OTN line adjustment is associated with the Ethernet channel adjustment so that the Ethernet equipment can correspondingly adjust the data traffic and the Ethernet channel when the OTN carries out the OTN line adjustment, thereby ensuring the correct transmission of data, and improving the overall performance of a network.

Embodiment 6

Figure 6:
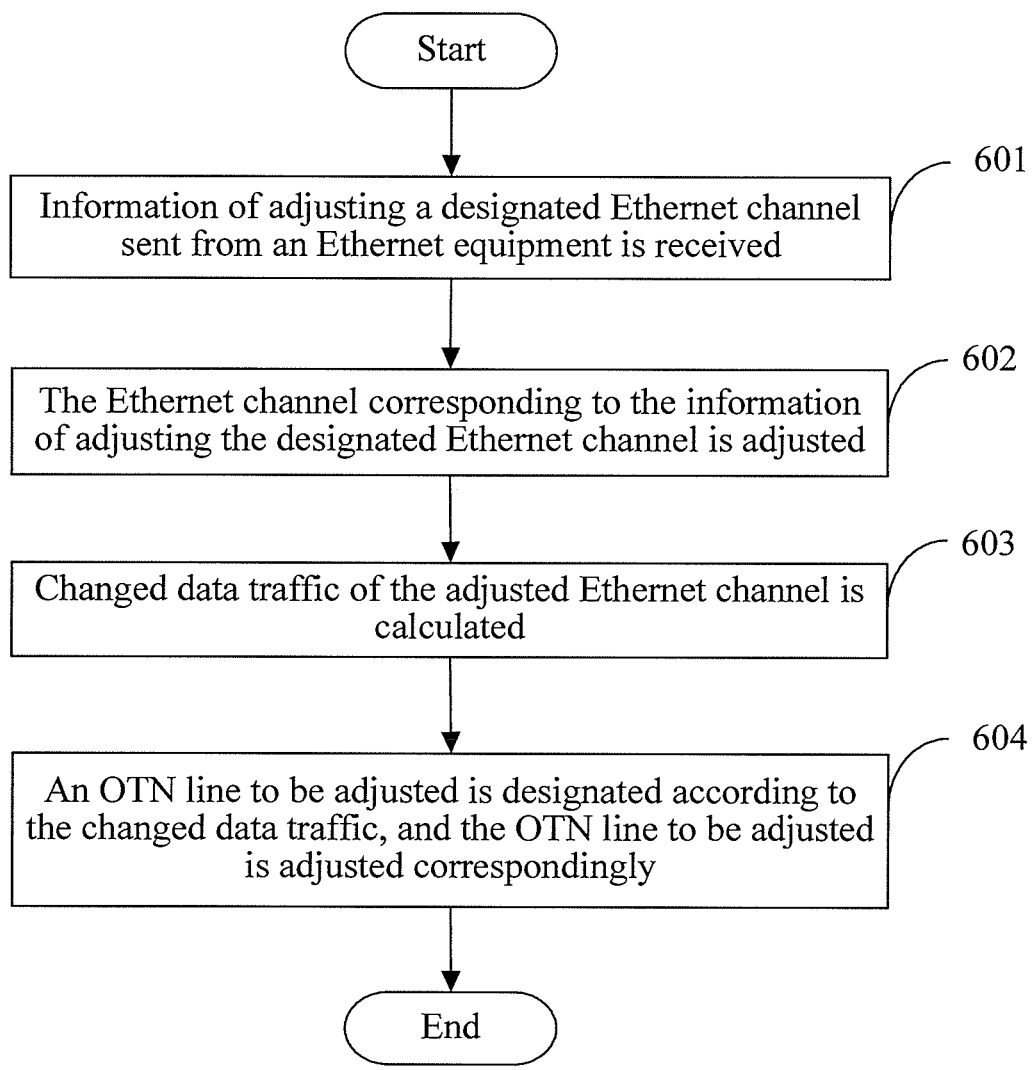
FIG. 6 is a flow chart of a method for adjusting transmission of transport network data according to Embodiment 6 of the present invention.

In the embodiment, the present invention provides a method for adjusting transmission of transport network data, which is applicable to a case in which an Ethernet channel is adjusted when data traffic of an Ethernet equipment is changed, and an OTN is requested to correspondingly adjust an OTN line. FIG. 6 is a flow chart of the method for adjusting transmission of transport network data according to Embodiment 6 of the present invention. As shown in FIG. 6, the method includes the following specific steps.

In 601, information of adjusting a designated Ethernet channel sent from the Ethernet equipment is received.

In 602, the Ethernet channel corresponding to the information of adjusting the designated Ethernet channel is adjusted.

Specifically, when the received information of adjusting the designated Ethernet channel is to close the designated Ethernet channel, the Ethernet channel to be adjusted and closed is acquired according to the information, and sending of data on the Ethernet channel to be adjusted and closed is stopped. At the same time, indication information is inserted into the Ethernet channel for instructing the Ethernet equipment not to transmit data on the Ethernet channel.

Correspondingly, when the received information of adjusting the designated Ethernet channel is to open the designated Ethernet channel, the Ethernet channel to be adjusted and opened is acquired according to the information, and sending of data in the Ethernet channel to be adjusted and opened starts. At the same time, indication information is inserted into the Ethernet channel for instructing the Ethernet equipment to transmit data in the Ethernet channel.

In 603, changed data traffic of the adjusted Ethernet channel is calculated.

Specifically, when the information sent from the Ethernet equipment is to close the designated Ethernet channel, data traffic decreased after closing the Ethernet channel is calculated according to the information of closing the designated Ethernet channel. Correspondingly, when the information sent from the Ethernet equipment is to open the designated Ethernet channel, data traffic increased after opening the Ethernet channel is calculated according to the information of opening the designated Ethernet channel.

In 604, an OTN line to be adjusted is designated according to the changed data traffic, and the OTN line to be adjusted is correspondingly adjusted.

Specifically, when information of the changed data traffic is the decreased data traffic, the OTN line to be closed is designated through negotiation with the OTN according to the decreased data traffic, and the OTN line is closed, that is, a virtually concatenated container in the OTN line is deleted. Correspondingly, when the information of the changed data traffic is the increased data traffic, the OTN line to be opened is designated through negotiation with the OTN according to the increased data traffic, and the OTN line is opened, that is, a virtually concatenated container is added in the OTN line.

In addition, when the OTN line to be closed is designated, it should be ensured that the data traffic decreased after closing the OTN line is lower than the decreased data traffic of the Ethernet equipment, so as to ensure that Ethernet signals may be born by enough OTN lines. When the OTN line to be opened is designated, it should be ensured that the data traffic increased after opening the OTN line is higher than the increased data traffic of the Ethernet equipment.

The closing or the opening of the OTN line is bidirectional, that is, the input and the output of the OTN line are closed or opened at the same time.

After the OTN line adjustment and the Ethernet channel adjustment are completed, the Ethernet equipment transmits data on the adjusted Ethernet channel; the OTN processes the transmitted data, for example, encapsulates and decapsulates the transmitted data, according to the adjusted Ethernet channel and total capacity of the OTN lines.

According to this embodiment, the Ethernet channel adjustment is associated with the OTN line adjustment so that the OTN line can be correspondingly adjusted when the Ethernet equipment carries out channel adjustment, thereby achieving the efficient utilization of the OTN bandwidth resources, and improving the overall performance of a network.

It should be understood that the embodiments described above are only preferred implementations of the present invention, and modifications and replacements made by persons of skill in the art within the scope of the technical solutions of the present invention shall fall within the protection scope of the present invention.

What is claimed is:

1. A method for adjusting transmission of transport network data, the method comprising:

receiving first information of adjusting a designated Optical Transport Network (OTN) line sent from an OTN;

closing the designated OTN line when the received first information is to close the designated OTN line, calculating decreased data traffic of the designated OTN line after closing the designated OTN line, designating a first Ethernet channel to be closed according to the decreased data traffic, stopping sending data on the first designated Ethernet channel, and inserting indication information in the first designated Ethernet channel for instructing an Ethernet equipment not to transmit data on the first designated Ethernet channel; or opening the designated OTN line when the received first information is to open the designated OTN line, calculating increased data traffic of the designated OTN line after opening the designated OTN line, designating a first Ethernet channel to be opened according to the increased data traffic, sending data on the first designated Ethernet channel, and inserting indication information in the first designated Ethernet channel for instructing the Ethernet equipment to transmit data on the first designated Ethernet channel.

2. The method for adjusting transmission of transport network data according to claim 1, further comprising:

receiving second information of adjusting a second designated Ethernet channel sent from the Ethernet equipment;

stopping sending data on the second designated Ethernet channel when the received second information is to close the second designated Ethernet channel, and inserting indication information in the second designated Ethernet channel for instructing the Ethernet equipment not to send data on the second designated Ethernet channel; calculating decreased data traffic of the second designated Ethernet channel after closing the second designated Ethernet channel; designating an OTN line to be closed according to the decreased data traffic and closing the designated OTN line; or starting to send data on the second designated Ethernet channel when the received second information is to open the second designated Ethernet channel, and inserting indication information in the second designated Ethernet channel for instructing the Ethernet equipment to send data on the second designated Ethernet channel; calculating increased data traffic of the second designated Ethernet channel after opening the second designated Ethernet channel; designating an OTN line to be opened according to the increased data traffic and opening the designated OTN line.

3. A device for adjusting transmission of transport network data, the device comprising a Link Capacity Adjust Scheme (LCAS) module and a channel processing module:

the LCAS module includes a capacity decrease unit and a capacity increase unit:

the capacity decrease unit, configured to close a designated Optical Transport Network, OTN, line when information of adjusting the designated OTN line sent from the OTN is to close the designated OTN line, calculate decreased data traffic of the designated OTN line after closing the designated OTN line, and send information of the decreased data traffic to the channel processing module; and the capacity increase unit, configured to open the designated OTN line when the information of adjusting the designated OTN line sent from the OTN is to open the designated OTN line, calculate increased data traffic of the designated OTN line after opening the designated OTN line, and send information of the increased data traffic to the channel processing module;

the channel processing module includes a channel control unit, a first channel processing unit, and a second channel processing unit:

the channel control unit, configured to designate a first Ethernet channel to be closed according to the decreased data traffic when the changed data traffic is the decreased data traffic, and send control information of closing the first designated Ethernet channel to the first channel processing unit and the second channel processing unit; and designate an first Ethernet channel to be opened according to the increased data traffic when the changed data traffic is the increased data traffic, and send control information of opening the first designated Ethernet channel to the first channel processing unit and the second channel processing unit;

the first channel processing unit, configured to stop receiving data from the first designated Ethernet channel when receiving the control information of closing the first designated Ethernet channel, and send data of the first designated Ethernet channel when receiving the control information of opening the first designated Ethernet channel; and the second channel processing unit is configured to stop sending data to the first designated Ethernet channel when receiving the control information of closing the first designated Ethernet channel, and insert indication information in the first designated Ethernet channel for instructing the Ethernet equipment not to transmit data on the first designated Ethernet channel; and send data to the first designated Ethernet channel when receiving the information of opening the first designated Ethernet channel, and insert indication information in the first designated Ethernet channel for instructing the Ethernet equipment to transmit data on the first designated Ethernet channel.

4. The device for adjusting transmission of transport network data according to claim 3, wherein:

the channel control unit is further configured to send the control information of closing a second designated Ethernet channel to the first channel processing unit and the second channel processing unit when received information of adjusting the second designated Ethernet channel sent from the Ethernet equipment is to close the second designated Ethernet channel, calculate decreased data traffic of the second designated Ethernet channel after closing the second designated Ethernet channel, and send information of the decreased data traffic to the LCAS module; and send the control information of opening the second designated Ethernet channel to the first channel processing unit and the second channel processing unit when the received information of adjusting the second designated Ethernet channel sent from the Ethernet equipment is to open the second designated Ethernet channel, calculate increased data traffic of the second designated Ethernet channel after opening the second designated Ethernet channel, and send information of the increased data traffic to the LCAS module;

the first channel processing unit is further configured to stop receiving data from the second designated Ethernet channel when receiving the control information of closing the second designated Ethernet channel, and send data of the second designated Ethernet channel when receiving the control information of opening the second designated Ethernet channel; and the second channel processing unit is further configured to stop sending data to the second designated Ethernet channel when receiving the control information of closing the second designated Ethernet channel, and insert indication information in the second designated Ethernet channel for instructing the Ethernet equipment not to transmit data on the second designated Ethernet channel; and send data to the second designated Ethernet channel when receiving the information of opening the second designated Ethernet channel, and insert indication information in the second designated Ethernet channel for instructing the Ethernet equipment to transmit data on the second designated Ethernet channel;

the capacity decrease unit is further configured to designate the OTN line to be closed according to the decreased data traffic when receiving the information of the decreased data traffic sent from the channel control unit, and close the designated OTN line; and the capacity increase unit is further configured to designate the OTN line to be opened according to the increased data traffic when receiving the information of the increased data traffic sent from the channel control unit, and open the designated OTN line.

* * * * *